Aug. 26, 1941.   J. T. KRAPP   2,253,628
COUPLING DEVICE
Filed Oct. 21, 1939
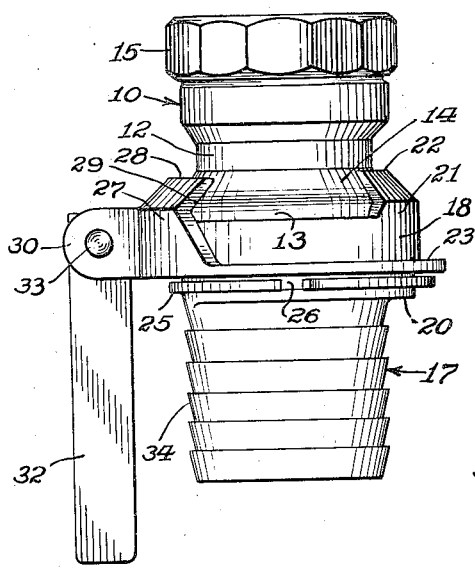
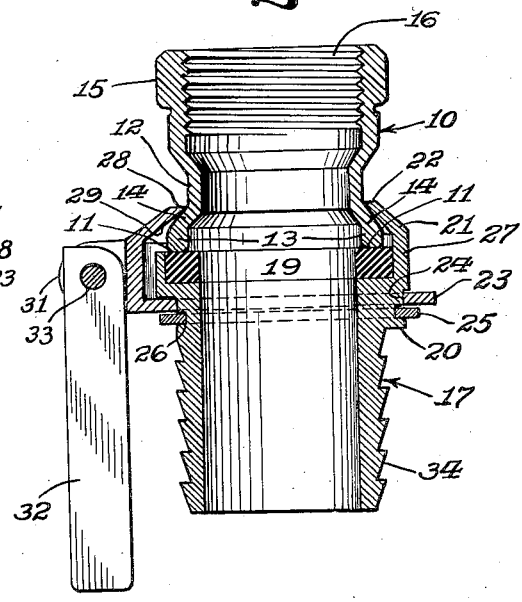
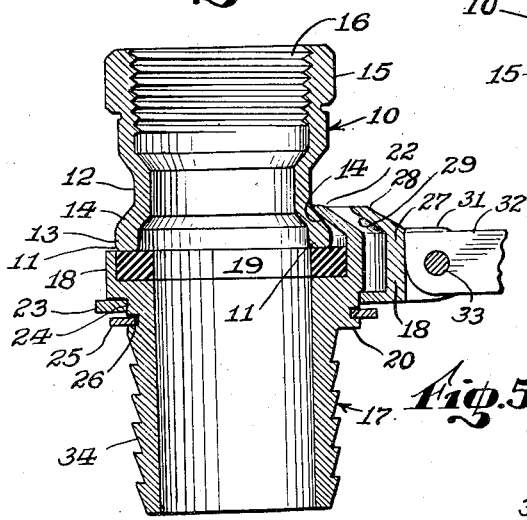
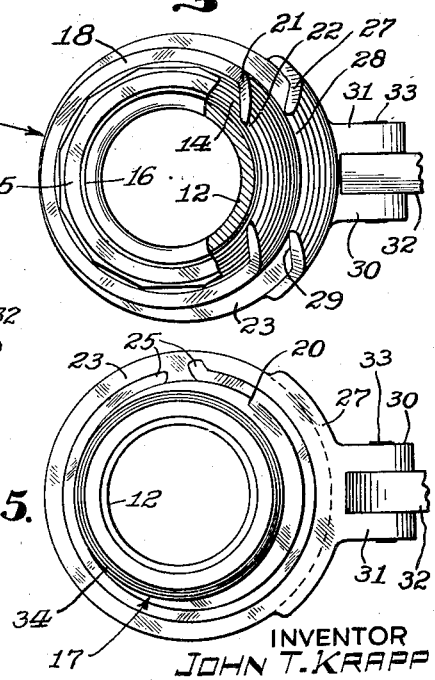
INVENTOR
JOHN T. KRAPP
BY Van Deventer & Grier
ATTORNEYS Patented Aug. 26, 1941

2,253,628

UNITED STATES PATENT OFFICE 2,253,628

COUPLING DEVICE

John T. Krapp, Port Jefferson, N. Y.

Application October 21, 1939, Serial No. 300,509

6 Claims. (Cl. 285—129)

This invention relates to improvements in coupling devices and has for an object the provision of a pair of coupling devices adapted to be quickly connected together in fluid-tight relation and/or to be quickly disconnected or disassociated from each other.

Another object of the invention is the provision of a coupling device comprised of a member having a flat annular sealing surface and an annular tapered engaging surface, and a second member having a gasketed sealing surface to be engaged by said flat sealing surface, a fixed engaging member and a movable engaging member for engaging said annular tapered engaging surface, said movable engaging member being adapted to be moved along a path eccentric to the longitudinal axes of the coupling members whereby the sealing surfaces may be forced into sealed relation with the gasket.

A further object of the invention is the provision of a method of maintaining sealing surfaces under pressure with a gasket therebetween which consists of providing cooperative conical engaging surfaces and eccentrically changing the relation of the surfaces in a manner to urge the surfaces toward each other axially.

Other objects and advantages of the invention will be apparent to those skilled in the art.

Referring to the drawing:

Figure 1 is an elevation of one embodiment of the invention showing a coupling device in which the two members are held in sealing relation;

Figure 2 is a cross-sectional view of the coupling device shown in Figure 1;

Figure 3 is a view similar to Figure 2, except that the means for locking the members together is in the disengaged position;

Figure 4 is a view of the arrangement shown in Figure 3 as viewed from the top thereof; and Figure 5 is a view of the arrangement shown in Figure 3 as viewed from the bottom thereof.

The member 10, which might be termed the "male member" of the coupling, is provided at one end with a flat annular sealing surface 11. The body of the member has a portion 12 of reduced diameter as compared with the diameter of the end portion 13 adjacent to the sealing surface 11.

The end portion 13 and the reduced portion 12 are joined by a conical portion 14 which cooperates with parts of the other coupling member to be presently described.

The end 15 is adapted to be connected to apparatus or equipment with which the coupling member 10 is to be used. In the example given, the end 15 is made twelve sided, but it is obvious that it may be made hexagonal, octagonal, etc., or it may be left round and knurled. The interior bore of the end 15 may be provided with threads 16 so that the coupling member 10 may be connected to the apparatus with which it is to be associated.

The coupling member, generally designated by the numeral 17, has a flanged end 18 provided with a counterbore for a gasket 19. Beneath the flange 18 is a boss 20 which is eccentric to the axis of the flange 18.

The flange 18 as viewed in Figures 1 to 4 has a segmental extension 21 the terminus 22 of which is conoidal in form and having its inner surface adapted to cooperate with the outer conical surface of the conical portion 14 of the member 10, as will presently be described.

A plate 23, having an eccentric hole 24 therethrough is mounted on the eccentric boss 20 and is retained thereon by means of a spring ring 25 fitting in a groove 26 formed in the eccentric boss 20 a sufficient distance away from the plate 23 to permit it to be moved freely. Preferably formed integral with the ring 23 is an upstanding arcuate sector 27, and a conoidal extension 28 of the sector 27 has an inner surface 29 adapted to cooperate with the surface of the conical portion 14 of the coupling member 15. It is preferred that the angle which the inner surface 29 of the conoidal sector 28 makes with the vertical axis of the coupling member be greater than the angle of the conical surface 14, for the reason that instead of the entire surface 29 engaging the surface 14, only a portion of the surface 29 will actually engage the surface 14. If the entire surface 29 engaged the surface 14, the frictional element would be too great and the wear of the surface would also be increased.

In the arrangement shown, the upper portion of the surface 29 engages the surface 14 along a substantially narrow line of contact.

In the embodiment herein shown, the plate 23 also carries adjacent to the sector 27, lugs 30 and 31 between which is pivotally mounted a handle 32, a shaft 33 forming the pivotal support for the handle 32.

In associating the coupling members 10 and 17, the plate 23 is first turned about the eccentric boss until the conoidal extension 28 is in the position shown in Figure 3, after which the member 10 is positioned on the gasket 19 with the conical surface 14 in contact with the interior surface of the conoidal section 22, after which the plate 23 is rotated to bring the surface 29 of the conoidal section 28 in contact with the surface 14 at some point opposite, or almost opposite, the point where the conoidal section 22 engages the surface 14. This may be anywhere from approximately 155° to approximately 178°.

The act of rotating the plate 23 as described is facilitated by means of the handle 32. As the plate is rotated, the leading edge of the sector 28 contacts the surface 14 and continued rotation of the plate causes the coupling member 10 to move to the right and downwardly into the gasket (as viewed in Figure 3) until a point is reached where a positive seal between the coupling members and the gasket is effected.

In some embodiments of the invention, particularly those for use in connection with devices where the coupling members would be small in physical size, the addition of the handle 32 and the lugs 31 for carrying this handle may not be necessary and in place of this, the edges of the plate may be knurled or any other means may be provided to facilitate the turning of the plate 23 in the manner described. For example, if the coupling member were to be used in connection with a hypodermic needle, the member 10 could be made integral with or attached to the needle, and the member 17 could be made integral with or attached to the body of the hypodermic needle.

In connection with devices employing the invention which contemplates the use of large conduits carrying very high pressures, the plate 23 may be provided with oppositely disposed handles such as 32 to facilitate the securing of sealing relation between the large surfaces of the members.

From the above, it can be seen that I do not intend to be limited as to the size of the coupling member, nor do I intend to be limited in the manner in which the members are secured to the apparatus with which they are to be used. The threaded connection to the member 10 and the stepped surface 34 of the member 17 are given by way of example only, the former for connecting to a threaded pipe and the latter for having a hose connected thereto.

What is claimed is:

1. In a coupling device in combination, a coupling member having an end sealing surface and an engageable surface spaced apart from said sealing surface, and a second coupling member having an end sealing surface adapted to be co-related with said first sealing surface and having a pair of engaging members, one of which is movable circumferentially relative to the other toward a position diametrically opposite the latter for engaging said engageable surface to force and maintain said sealing surfaces in sealed relation.

2. In a coupling device, in combination, a coupling member having an end sealing surface and an engageable surface spaced apart therefrom, a second coupling member having an end sealing surface adapted to be co-related with said first sealing surface, a gasket between said end sealing surfaces, a fixed engaging member on said second coupling member, and a movable engaging member carried on said second coupling adapted to be moved relative to said fixed engaging member whereby with said engaging members engaging said engageable surface, said movable engaging member may be circumferentially moved toward a position diametrically opposite said fixed engaging member for forcing said sealing surfaces and said gasket into fluid-tight relation.

3. In a coupling device, two coupling members adapted to be maintained in fluid-tight relation with deformable means therebetween, means for forcing and maintaining said coupling members into said relation, comprising engageable means carried by one of said coupling members and a plurality of engaging members carried by the other coupling member, and means for moving one of said engaging members along a circumferential path toward a position diametrically opposite the other engaging member when said engaging members are in engagement with said engageable means to bring said coupling members into said relation.

4. In a coupling device, two coupling members adapted to be maintained in fluid-tight relation with each other with gasket means therebetween, means for forcing and maintaining said coupling members into said relation comprising a conical engaging surface formed on one of said coupling members, and a fixed and a movable engaging means carried by the other coupling member, whereby said fixed engaging means may engage one side of said conical surface and said movable engaging means may be moved along an eccentric path toward the opposite side of said conical surface to produce a camming action forcing said members together endwise.

5. In a coupling device, a pair of coupling members adapted to be maintained in cooperative relationship with each other, a pair of overhanging engaging members carried by one of said coupling members, one being fixed and the other being movable along a path eccentric to the axis thereof, and means carried by the other of said coupling members having an exterior conical face to be engaged by said overhanging engaging members and moved both axially and laterally as the movable engaging member is moved along said path toward a position in opposition to the fixed engaging member.

6. In a coupling device, a pair of coupling members including sealing surfaces adapted to be maintained in fluid-tight relationship with each other with a gasket therebetween, and means partly carried by both said members for moving said members axially toward each other and for at the same time moving said members laterally in a direction tending to bring their axes into alignment with each other.

JOHN T. KRAPP.